(12) United States Patent
Holliday et al.

(10) Patent No.: US 7,216,431 B2
(45) Date of Patent: May 15, 2007

(54) ADJUSTABLE STRIPPING TOOL

(75) Inventors: Randall A. Holliday, Broomfield, CO (US); Gwo-Jiang Liaw, Shulin (TW)

(73) Assignee: International Communication Manufacturing Corporation, Denver, CO (US)

( * ) Notice: Subject to any disclaimer, the term of this patent is extended or adjusted under 35 U.S.C. 154(b) by 260 days.

(21) Appl. No.: 11/058,787

(22) Filed: Feb. 15, 2005

(65) Prior Publication Data

US 2006/0179662 A1 Aug. 17, 2006

(51) Int. Cl.
*B21F 13/00* (2006.01)
*B26B 27/00* (2006.01)
*H02G 1/12* (2006.01)

(52) U.S. Cl. .................. 30/90.7; 30/90.1; 30/250; 81/9.4

(58) Field of Classification Search ............ 30/90.7, 30/90.1, 250, 252, 258, 260, 261, 92, 9.4; 81/9.44
See application file for complete search history.

(56) References Cited

U.S. PATENT DOCUMENTS

| | | | |
|---|---|---|---|
| 4,485,696 A * | 12/1984 | Bieganski ............ 81/9.41 |
| 4,625,386 A | 12/1986 | Bieganski | |
| 4,829,671 A | 5/1989 | Cheng | |
| 4,953,428 A | 9/1990 | Commes | |
| 4,981,032 A * | 1/1991 | Chen .................. 72/409.14 |
| 5,009,006 A * | 4/1991 | Sawyer et al. ........... 30/90.6 |
| 5,012,666 A * | 5/1991 | Chen et al. ........... 72/409.01 |
| 5,036,734 A | 8/1991 | Morrow | |
| 5,070,615 A * | 12/1991 | Michael, III ............ 30/90.8 |
| 5,150,522 A * | 9/1992 | Gwo-Jiang ............ 30/91.2 |
| 5,402,561 A * | 4/1995 | Cerquone et al. ......... 29/751 |
| 5,491,894 A * | 2/1996 | Bieganski ............ 30/90.1 |
| 5,724,871 A * | 3/1998 | Wall .................... 81/9.43 |
| 6,079,296 A * | 6/2000 | Muromoto ............ 81/9.43 |
| 6,128,976 A | 10/2000 | Tarpill | |
| 6,253,641 B1 | 7/2001 | Tarpill | |
| 6,505,399 B2 * | 1/2003 | Lo et al. ............... 29/825 |
| 6,671,944 B2 | 1/2004 | Holliday | |
| 6,718,638 B2 | 4/2004 | Liaw | |

* cited by examiner

*Primary Examiner*—Lee D. Wilson
*Assistant Examiner*—Alvin J. Grant
(74) *Attorney, Agent, or Firm*—The Reilly Intellectual Property Law Firm, P.C.; John E. Reilly; Ellen Reilly

(57) ABSTRACT

A hand-held coaxial cable stripper made up of first and second jaws pivotally connected to a body portion including a channel for insertion of a cable end, the channel containing blade members and a blade adjustment member for precise and accurate adjustment of the cutting depth of the blade.

26 Claims, 7 Drawing Sheets

ADJUSTABLE STRIPPING TOOL

BACKGROUND AND FIELD OF INVENTION

This invention relates to cable tools; and more particularly relates to a novel and improved hand-held coaxial cable stripper for removing one or more layers from an end of a cable to facilitate connection of a selected fitting to the end of the cable.

Currently, there exist a number of different sizes and types of coaxial cables and cable fittings. This presents a problem in the field when a cable is of a different size than the stripping tool is adapted to cut. This results in having to carry multiple stripping tools adapted to cut different sized cables. Further, this also results in having to purchase a number of different sizes of stripping tools to conform to various sized cables. There exist a number of multi-purpose coaxial cable tools, for example, my U.S. Pat. No. 6,671,944 for MULTI-PURPOSE COAXIAL CABLE TOOL. The multi-purpose cable tools are versatile yet they do not provide for precise incremental adjustment of the cutting depth. There also exist coaxial cable strippers which may be adjusted to control the cutting length or cutting depth of the blades, such as, U.S. Pat. No. 6,718,638 to Liaw, but this stripping tool does not allow for incremental and precise adjustment of the cutting depth. In preparing a coaxial cable end, the length of the outer jacket is stripped from the cable end as well as a second length of the braided connector and insulator to expose the leading end of the inner conductor. A portion of the braided conductor is folded back over the leading edge of the dielectric outer jacket. It is critical to have proper preparation of the cable end to assure that a sealed connection is made with the fitting. In the case of coaxial cables, a dual cutting or stripping action is required in removing different layers from the end of the cable, and the thickness or depth of cut will vary with different cable sizes and types. There is an increasing demand for a lightweight, versatile stripping tool that will strip different sized cables in a precise and accurate manner. It is also important to have a hand-held device which is easy to use. If the depth of cut is incorrect, this could result in an improper connection with the fitting. Specifically, it is desirable to have an adjustable stripping tool to carry out manual stripping on a variety of different-sized cables.

SUMMARY OF THE INVENTION

It is therefore an object of the present invention to provide for a novel and improved cable tool for stripping a cable end in preparation for a crimping operation.

It is another object of the present invention to provide for a novel and improved coaxial cable tool for stripping different sized cable ends.

It is a further object of the present invention to provide for a novel and improved coaxial cable stripping tool which is economical to manufacture, is comprised of a minimum number of parts, is of lightweight construction and is extremely compact.

It is another object of the present invention to provide for a novel and improved coaxial cable stripping tool which allows for incremental adjustment of the cutting depth of the blades.

In accordance with the present invention, there has been devised a cable stripping tool for a cable having a center pin conductor and an outer insulating jacket wherein the tool comprises a hand-held body portion including a first jaw, a second jaw pivotally connected to the body portion, the second jaw being yieldingly biased toward the body portion, the first and second jaws having aligned transverse channels adjacent to one end of the body portion for insertion of an end of a cable to be stripped, one of the channels containing spaced-apart blade members and means for incrementally adjusting one of the blade members to a selected level according to the depth of cut to be made in the end of the cable. The tool also includes indicia on an external surface of the tool for indicating the depth of cut to be made in the end of the cable with the blade adjustment means including a rotation member and a screw member, the screw member engaging a lower outer edge of the blade member for adjusting the height of the blade member.

The above and other objects, advantages and features of the present invention will become more readily appreciated and understood from a consideration of the following detailed description of preferred and modified forms of the present invention when taken together with the accompanying drawings in which:

DETAILED DESCRIPTION OF PREFERRED FORM

Figure 1:
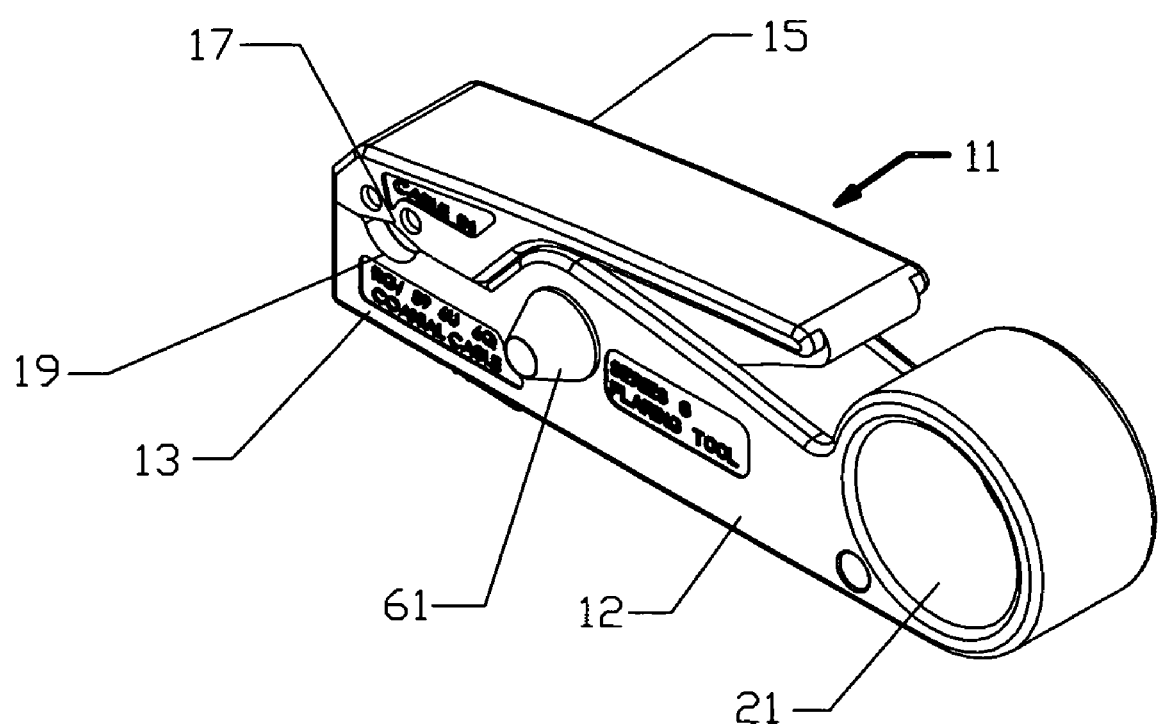
FIG. 1 is a perspective view of a preferred form of stripping tool in accordance with the present invention.
Figure 2:
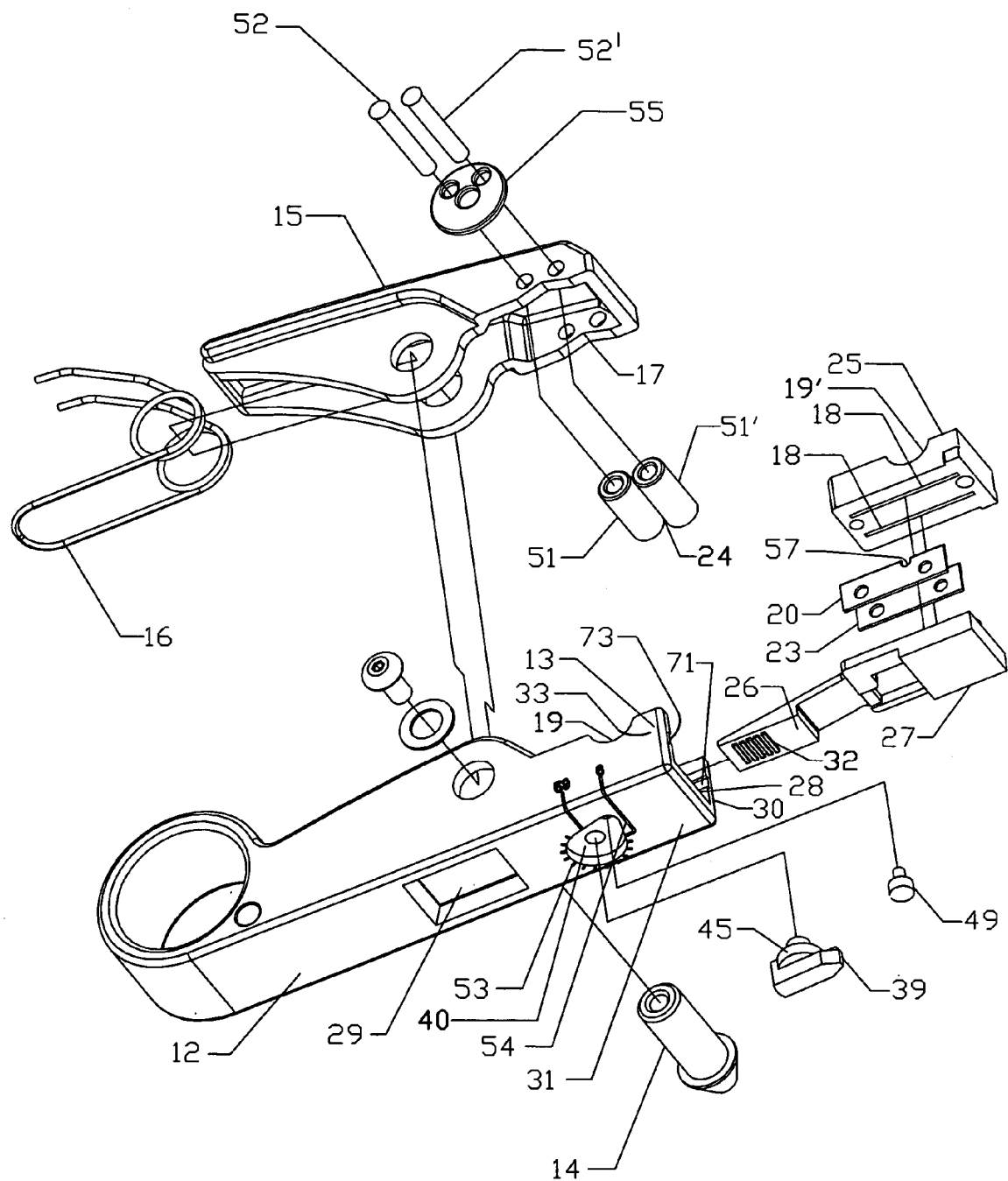
FIG. 2 is an exploded view of a preferred form of stripping tool in accordance with the present invention.

Referring to the drawings, there is illustrated in FIGS. 1 through 12 an incrementally adjustable stripping tool 11 which is broadly comprised of an elongated body 12 having a first upper jaw 15 and a second lower jaw 13 pivotally connected together with a pivot member 14. As shown in FIG. 2, the pivot member 14 is preferably a dual member pivot pin and the jaws 13 and 15 are yieldingly urged together by a clutch-type spring member 16 or any other type of biasing member.

Figure 8:
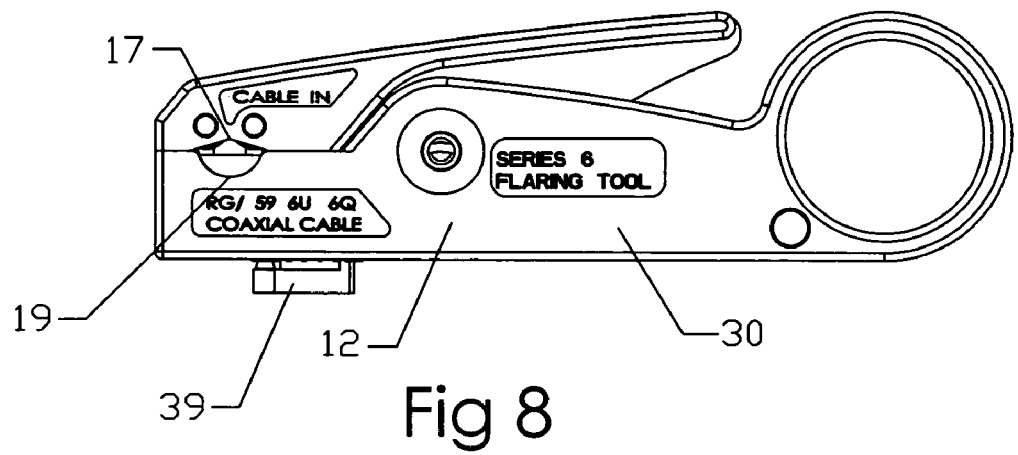
FIG. 8 is a side view of a preferred form of stripping tool as shown in FIG. 1 in accordance with the present invention.
Figure 10:
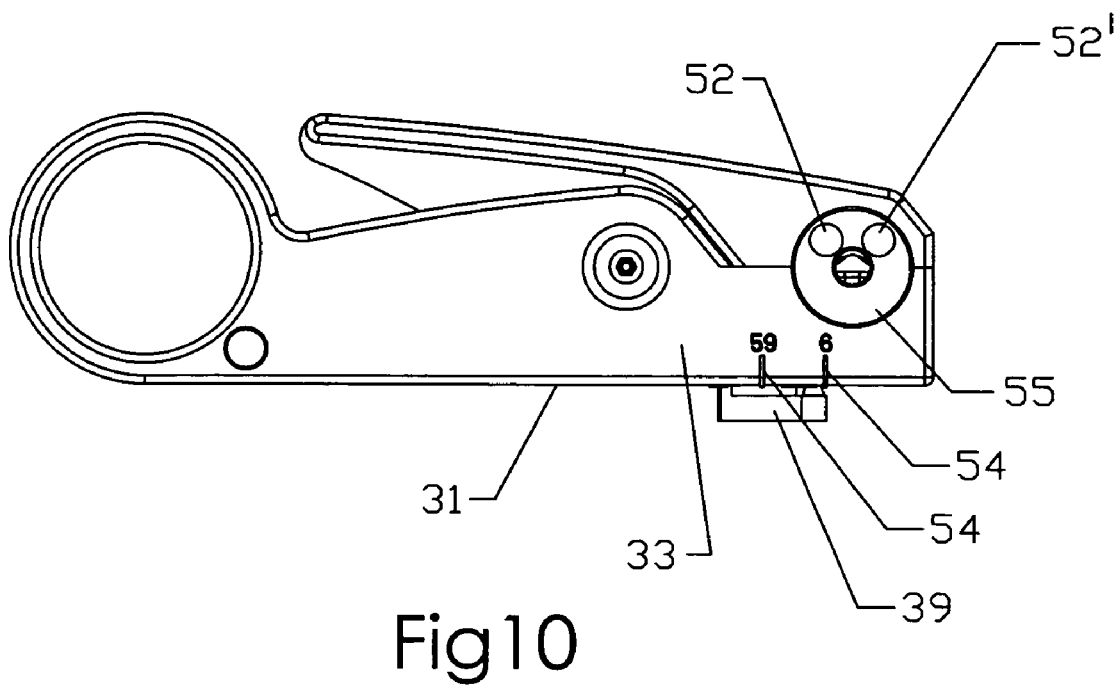
FIG. 10 is an opposite side view of FIG. 8 of a preferred form of stripping tool in accordance with the present invention.
Figure 11:
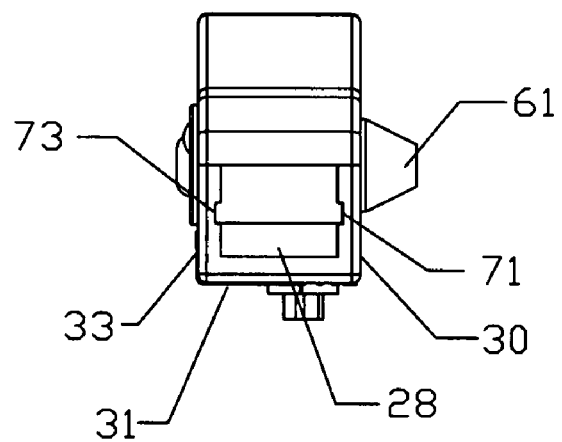
FIG. 11 is an end view of a preferred form of stripping tool in accordance with the present invention.
Figure 12:
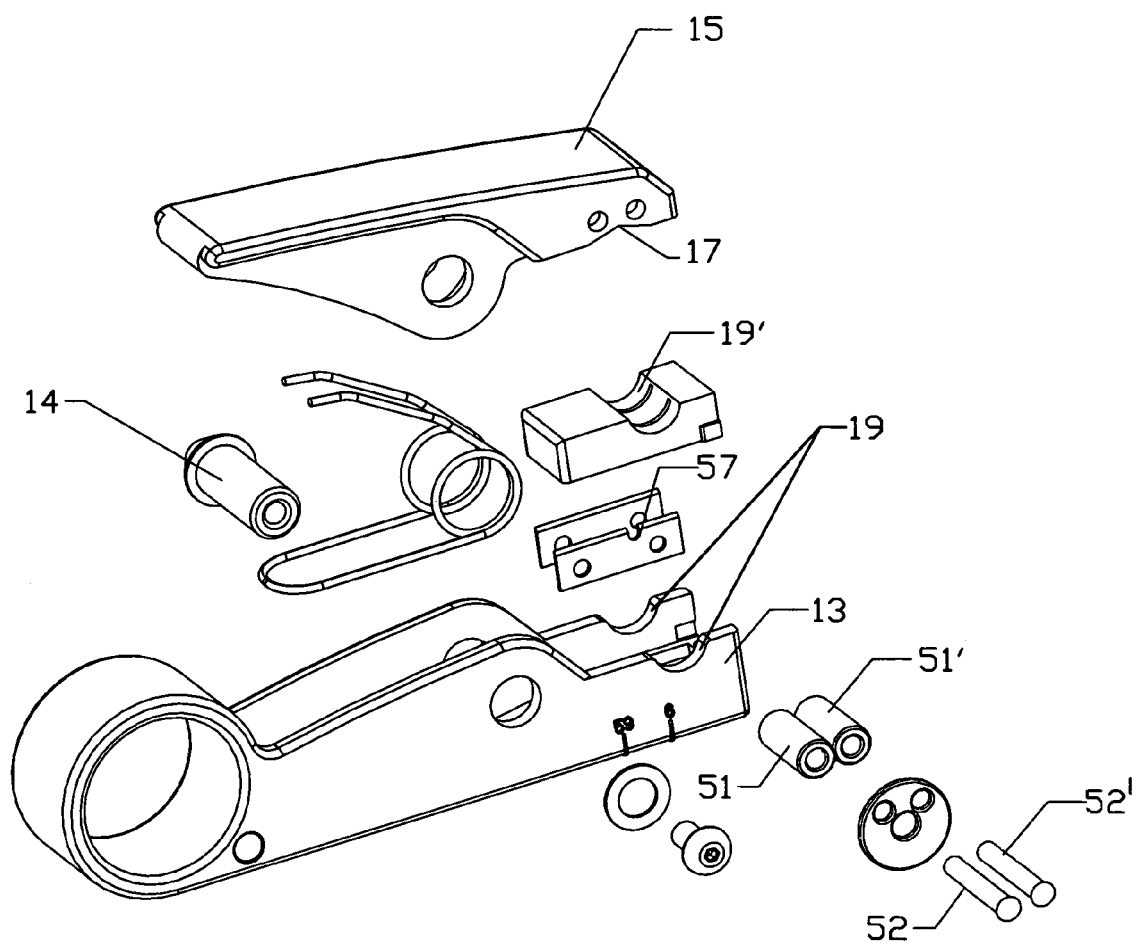
FIG. 12 is an exploded opposite view of FIG. 2 in accordance with the present invention.

Referring in more detail to the drawings, the first or upper jaw 15 and the second, lower jaw 13, as shown in FIGS. 1, 2 and 8, include aligned openings 17 and 19 sized to accommodate insertion of an end of a cable E to be stripped. The opening 17 is an inverted V-shape along opposite outer edges of the jaw 15. The opening 19 is in the form of a recessed semi-circle and is located along opposite outer edges of the jaw 13 as shown in FIG. 12. The combination of the openings 17 and 19 form a slightly rounded opening to accommodate the cable. A ring-like end portion 21 defines a finger grip or hold member at an opposite end to the first and second jaws 15 and 13 for rotation of the body about a cable end which is inserted for stripping into the aligned openings 17 and 19. The body 12 includes a bottom wall 31 and opposite side walls 30 and 33 as illustrated in FIGS. 8 to 11. The body 12 also includes a channel or recess 28 at the leading end of the jaw 13, as shown in FIG. 2 and FIG. 11. The channel 28 is defined by the opposite side walls 30 and 33 having beveled inside edges 71 and 73 as shown in FIGS. 2 and 11 for housing a first blade member 20 and a second blade member 23 in a replaceable blade cartridge 25. The blade cartridge 25 includes a semi-circular recess 19' which corresponds in shape to the openings 19 to permit passage of the cable end E. The blade cartridge 25 retains the blades 20 and 23 in a pair of spaced parallel slots 18 in the cartridge 25. The cartridge 25 is permanently mounted on a release platform 27 at the leading end of a pressure pad 26 and is aligned with an access door 29 in the bottom wall 31 of the lower jaw. The pressure pad 26 preferably has multiple protrusions or ridges 32 which provide a frictional surface for placement of a thumb of a user. The blade cartridge 25 is flush with an end wall of the channel 28 once it is inserted within the channel 28. The semi-circular recess 19' abuts each of the openings 19, forming a lower transverse channel 32. The recess 19' allows the cable end E to move downwardly as the blade members 20 and 23 cut through the cable. When the pressure pad is lifted slightly away from the door or opening 29, pressure can be applied to the pressure pad in a direction toward the leading end of the channel 28 to remove the entire blade cartridge 25 and platform 27 from the end of the tool, for example, when it is desired to replace the blade members 20 and 23. The removable blade cartridge 25 may be removed and replaced while maintaining a pre-set blade height.

Figure 3:
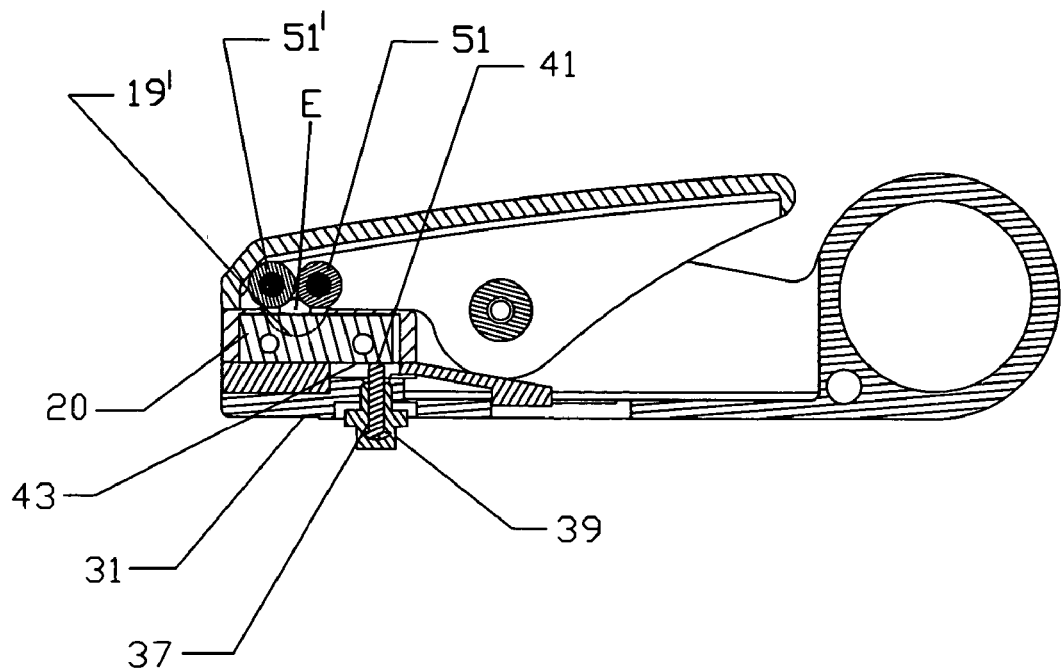
FIG. 3 is a sectional view of a preferred form of stripping tool illustrating the first blade member in a maximum height position.
Figure 4:
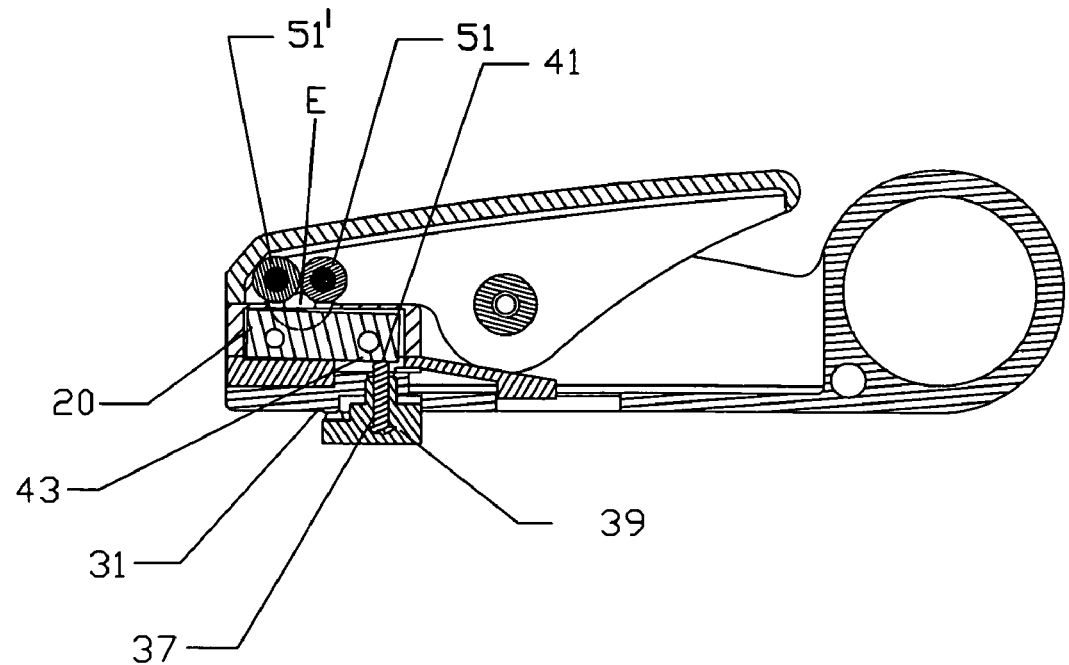
FIG. 4 is an alternate sectional view of a preferred form of stripping tool illustrating the first blade member at lower height adjustment.

As best seen in FIGS. 3 to 6, the first and second blade members 20 and 23 project upwardly from the slots 18. The height of the first blade 20 is adjusted by a blade adjustment member which includes a screw member 37 extending upwardly through the bottom wall 31 from a rotation member or knob 39, as shown in FIGS. 3 and 4. An upper end 41 of the screw member 37 engages a lower, outside edge 43 at one end of the first blade member 20, which is exposed through a recessed portion in the platform 27 for direct contact with the end of the screw 37. Rotation of the screw 37 by turning the rotation member 39 results in a variation of the height of the blade member 20 as shown in FIGS. 3 and 4. The rotation member 39 includes a circular portion or pin member 45 as shown in FIG. 2. There is also a rotation stop or rotation limiting member 49 located in a housing 40 designed to accommodate the rotation member 39. The rotation knob 39 has a flanged portion which limits the full rotation of the rotation knob 39 in combination with the limiting member or stop 49 but permits rotation to different selected settings according to the size fitting to be assembled onto the cable end. Removal and replacement of the blade cartridge 25 and platform 27 does not require rotation of the rotation knob 39. Replacement of the cartridge 25 does not alter the blade height and allows a user to maintain a pre-set blade height when changing the cartridge 25. It will be apparent that different types of rotation limiting members or limit stops may be used in place of the rotation limiting member 49, such as, arm members of different lengths or other types of adjustable members which can be selectively advanced into position.

Figure 5:
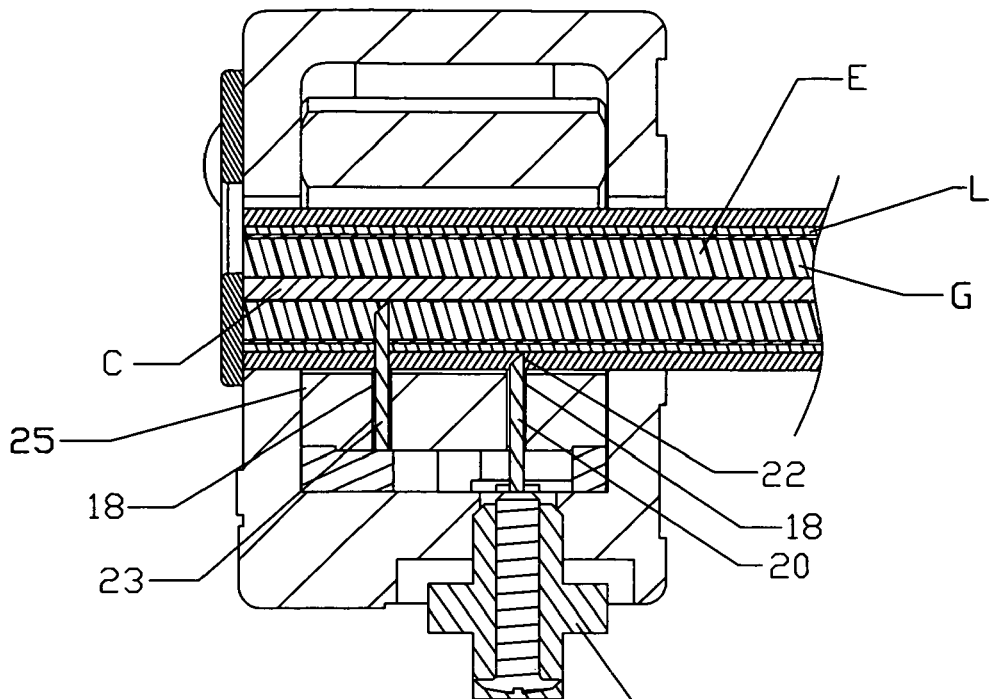
FIG. 5 is a sectional end view of a preferred form of stripping tool demonstrating initial stripping of the cable in accordance with the present invention.
Figure 6:
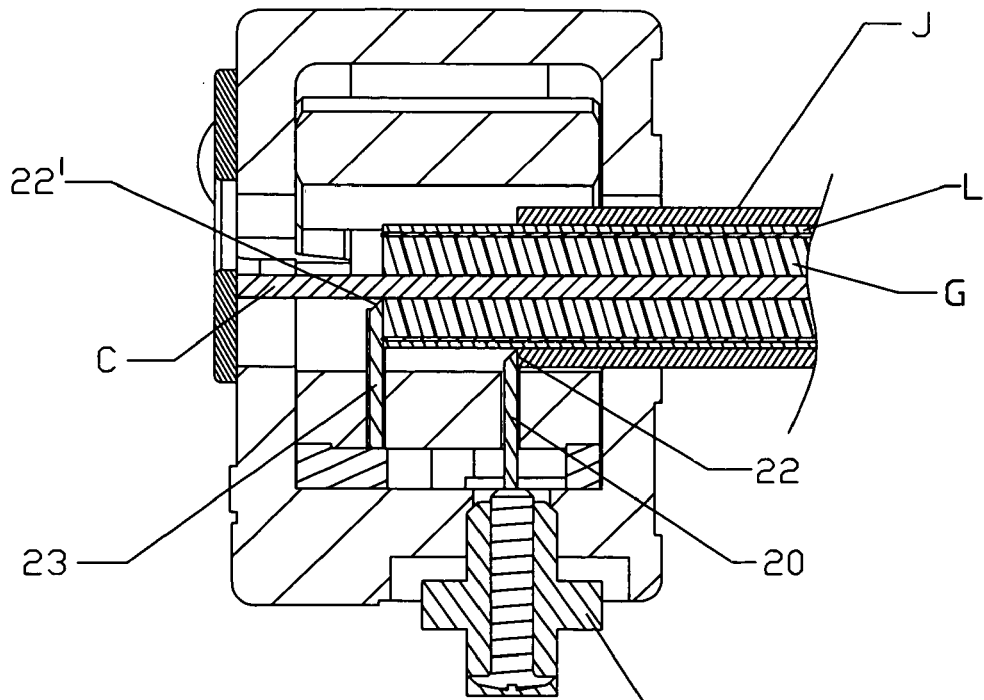
FIG. 6 is an alternate sectional end view of a preferred form of stripping tool in accordance with the present invention.
Figure 9:
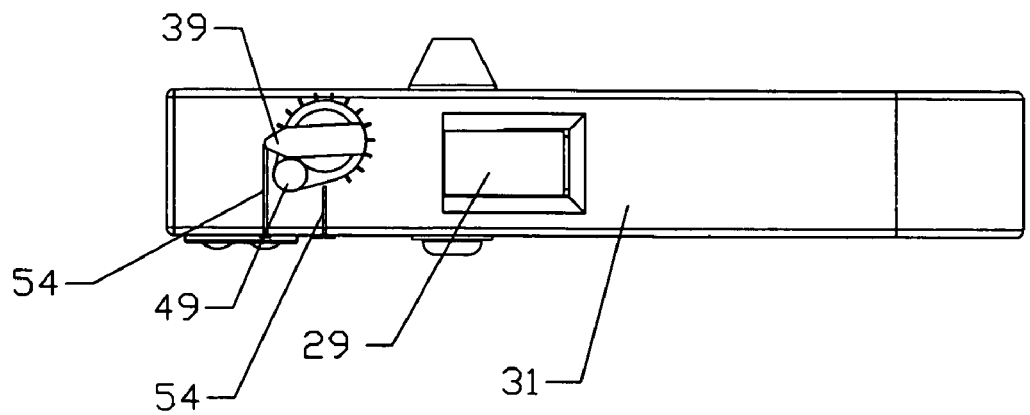
FIG. 9 is a bottom view of a preferred form of stripping tool in accordance with the present invention.

The bottom wall 31 of the body 12 contains a series of markings or indicia 53, shown in FIG. 9, which are calibrated to correspond to the desired depth of cut of a blade edge 22, as shown in FIGS. 5 and 6, in removing or stripping off the outer insulating jacket J of the cable end E. The indicia 53 also include numeric markings 54, as shown in FIGS. 9 and 10, which correspond to the type of connector to be stripped. As an example but not by way of limitation, the numeric marking 54 represented by a numeral "6", represents an RG6U connector. The numeric marking 54 represented by a numeral "59" represents an RG59 connector. The precise cut of the blade member as determined by rotation of the screw member 37 results in a depth of cut that may vary between 0.240" for an RG659 connector up to 0.273" for an RG6U connector. These are approximate depths of cut and may be varied depending on the type of cable connector to be stripped. The RG6U size fitting requires a greater depth of penetration of the blade 20 into the cable than the RG59 size fitting. As is apparent from the small difference in the depths of cut, by tilting one end of the blade upwardly, a very precise cut is necessary for proper connection. The incremental and precise cutting of the outer insulating jacket of the cable end E results in a more precise fit between the cable end E and a fitting (not shown).

The upper jaw 15 includes dual rollers 51, 51'. Rollers 51, 51' are secured to the first jaw 15 with bearings 52, 52'. The bearings 52, 52' are inserted through aligned openings on a stop member 55 which acts to prevent the cable end E from advancing beyond the tool 11 and corresponding openings on the jaw 15. The bearings 52 and 52' are then inserted into openings in the rollers 51, 51'. The rollers 51, 51' are aligned in a direction transversely of the length of the tool 11 and form an upper transverse channel 24 in the upper jaw 15 as shown in FIG. 2. The rollers 51, 51' retain the cable end E within the transverse channel 24 allowing for retention and rotation of the cable end E in order for the blade members 20 and 23 to cut the entire circumference of the cable.

In practice, the depth of cut to be made in the cable end E is first determined. The cable end E includes an inner conductor C, an inner insulating layer G, an outer, braided conductive layer L and outer insulating jacket J. The indicia 53 on the external surface of the bottom wall 31 indicate the depth of cut to be made by the first blade 20 in the outer insulating jacket J. The first blade member 20 may be adjusted in height incrementally by rotating the rotation knob 39. The adjustable rotation knob 39 is pivotally mounted on the pin member 45. Turning of the rotation knob 39 results in an incremental rotation of the screw member 37, which in turn engages the lower, outside edge 43 of the blade member 20, forcing it to tilt upwardly or downwardly, depending upon the direction of rotation of the rotation knob 39. The cable end E is then placed within the upper transverse channel 24 which is aligned with the lower transverse channel 32 and abuts cable stop member 55 as shown in FIGS. 2 and 10. The first blade member 20 is positioned to strip the outer insulating jacket J of the cable end E while the second blade member 23 is positioned to penetrate the entire thickness of the cable end E down to an inner conductor C. This is shown in FIGS. 5 and 6. The rollers 51, 51' are aligned in a direction transversely of the length of the tool 11 and parallel to the cable end E. The rollers 51, 51' which form the transverse channel 24, bear down on the cable end E, forcing the blade members 20 and 23 to cut the entire circumference of the cable. The second blade member 23 includes a cable-receiving notch 57, which aids in removing all material so that the leading end of the conductor C is exposed. The spring member 16 forces the upper and lower jaws 15 and 13 into engagement with one another. The cable end E abuts the cable stop 55 and the leading end of the conductor C is housed in the cable-receiving opening 57. The cable is held in one hand and the tool 11 is held in the opposite hand. The cable is held stationary while the tool 11 containing the cable end E is rotated one or more times in a clockwise or counterclockwise direction to facilitate cutting of the outer insulating jacket as well as the entire jacket of the cable end E. Manual rotation of the tool with the aid of the rollers 51, 51' and finger hold 21 causes the blade edge 22 of the first blade 20 and a blade edge 22' of the second blade 23 to move into engagement with the cable and to cut the cable jacket to a desired thickness as the tool 11 is rotated about the cable.

Figure 7:
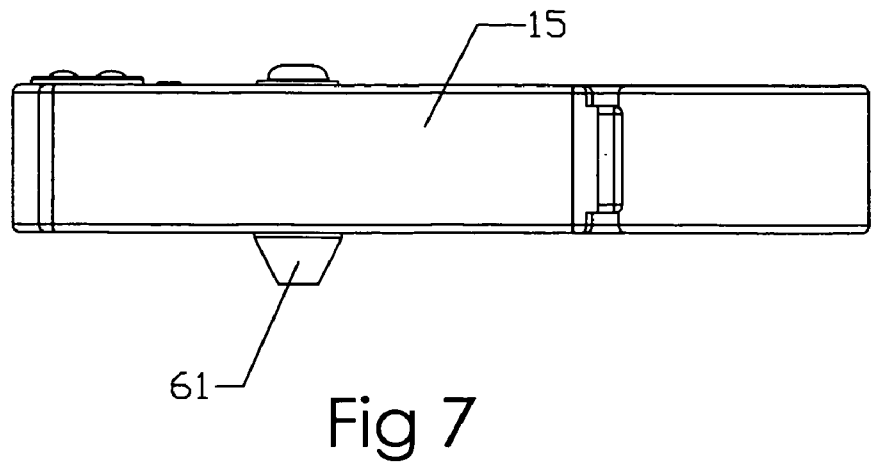
FIG. 7 is a top plan view of a preferred form of stripping tool in accordance with the present invention.

Finally, once the cable jacket has been cut to a desired depth, the cable is removed and this pulling action results in removal of the outer insulating jacket J from the cable by the blades 20 and 23. The end of the conductor C is exposed and then may be placed in a conical flaring tool or member 61 as shown in FIGS. 7 and 11 to spread the braided layer L over the outer insulating material and exposing the leading end of the conductor C.

It is therefore to be understood that while preferred forms of invention are herein set forth and described, the above and other modifications may be made therein without departing from the spirit and scope of the invention as defined by the appended claims and reasonable equivalents thereof.

We claim:

1. A cable stripping tool for a cable having a center pin conductor and an outer insulating jacket, said tool comprising:
    a hand-held body portion including a first jaw;
    a second jaw pivotally connected to said body portion, said second jaw being yieldingly biased toward said body portion;
    said first and second jaws having aligned transverse channels adjacent to one end of said body portion for insertion of an end of a cable to be stripped;
    at least one of said channels spaced apart blade members; and
    means for incrementally adjusting one of said blade members to a selected level according to the depth of cut to be made in said end of said cable.

2. A cable stripping tool according to claim 1 wherein said body portion includes means for indicating the depth of cut to be made in said end of said cable.

3. A cable stripping tool according to claim 1 wherein said adjustment means includes a rotation member and a screw member.

4. A cable stripping tool according to claim 3 wherein said rotation member is in surrounding relation to said screw member.

5. A cable stripping tool according to claim 3 wherein said rotation member is housed within said body portion.

6. A cable stripping tool according to claim 3 wherein said screw member engages a lower, outer edge of said one of said blade members.

7. A cable stripping tool according to claim 3 wherein said adjustment means includes means for limiting the range of rotation of said rotation member.

8. A cable stripping tool according to claim 1 wherein said spaced apart blade members are located within said channel of said first jaw.

9. A cable stripping tool according to claim 1 wherein said spaced apart blade members are connected to a base member, said base member being removably inserted within said channel and including means for removing and replacing said blade members while maintaining a pre-set blade height.

10. A cable stripping tool according to claim 9 wherein said base member includes a recessed portion spanning the width of said base member.

11. A cable stripping tool according to claim 1 wherein said second jaw includes dual roller members aligned in a direction transverse of the length of said tool.

12. A cable stripping tool according to claim 1 wherein said second jaw includes a cable stop member.

13. A cable stripping tool according to claim 1 wherein said body portion includes a conical flaring member.

14. A cable stripping tool for a cable having a center pin conductor and an outer insulating jacket, said tool comprising:
    a hand-held body portion including upper and lower jaw members;
    said upper jaw member pivotally connected to said body portion, means for yieldingly urging said upper jaw member toward said body portion; and
    said upper and lower jaw members having aligned transverse channels adjacent to one end of said body portion for insertion of an end of a cable to be stripped, said transverse channel in said lower jaw containing at least one blade member and an incremental blade adjustment member located on an underside and in touching relation to said blade member.

15. A cable stripping tool according to claim 14 wherein said blade adjustment member engages a lower side edge of said blade member.

16. A cable stripping tool according to claim 14 wherein said lower jaw channel includes two blade members.

17. A cable stripping tool according to claim 14 wherein said body portion includes cutting indicia on an external surface proximate to said blade adjustment member.

18. A cable stripping tool according to claim 14 wherein said incremental blade adjustment member includes means for controlling the depth of cut to be made in said end of said cable.

19. A cable stripping tool according to claim 14 wherein said channel in said upper jaw contains means for retaining and rotating said cable within said channels.

20. A cable stripping tool according to claim 19 wherein said retaining and rotating means includes a cable stop member.

21. In a coaxial cable stripping tool for a cable having an inner and outer conductive layer, said tool comprising:
    a hand-held base member, said base member including upper and lower jaw members at one end and a circular opening at an opposite end;
    said upper jaw member pivotally connected and yieldingly biased toward said lower jaw member;
    said upper and lower jaw members having aligned transverse channels for insertion of an end of a cable, said lower jaw member containing at least one spaced apart blade member;
    means for incrementally adjusting said blade member to a selected level according to the depth of cut to be made in said end of said cable; and
    means for indicating the depth of cut to be made in said end of said cable.

22. In a cable stripping tool according to claim 21 wherein said adjustment means is defined by a rotation member threadedly engaged with said body portion.

23. In a cable stripping tool according to claim 22 wherein said adjustment means further includes means for limiting rotation of said rotation member.

24. In a cable stripping tool according to claim 22 wherein said rotation member includes a screw having a blade member-engaging end.

25. In a cable stripping tool according to claim 23 wherein said limiting means includes a flange on said external surface.

26. In a cable stripping tool according to claim 21 wherein said base member includes an external conical portion for spreading said outer conductive layer.

* * * * *